United States Patent [19]
Buchler

[11] Patent Number: 5,757,316
[45] Date of Patent: May 26, 1998

[54] ATTITUDE DETERMINATION UTILIZING AN INERTIAL MEASUREMENT UNIT AND A PLURALITY OF SATELLITE TRANSMITTERS

[75] Inventor: Robert J. Buchler, Calabasas Park, Calif.

[73] Assignee: Litton Systems, Inc., Woodland Hills, Calif.

[21] Appl. No.: 790,214

[22] Filed: Feb. 1, 1997

[51] Int. Cl.$^6$ .................... G01S 5/07; G01C 21/00
[52] U.S. Cl. ................ 342/357; 364/449.9
[58] Field of Search .............. 342/357; 364/449.7, 364/449.8, 449.95, 454

[56] References Cited

U.S. PATENT DOCUMENTS

| | | | |
|---|---|---|---|
| 4,754,280 | 6/1988 | Brown et al. | 342/357 |
| 5,296,861 | 3/1994 | Knight | 342/357 |
| 5,416,712 | 5/1995 | Geier et al. | 364/450 |
| 5,543,804 | 8/1996 | Buchler et al. | 342/357 |
| 5,617,317 | 4/1997 | Ignagni | 364/449.9 |

*Primary Examiner*—Gregory C. Issing
*Attorney, Agent, or Firm*—Robert E. Malm

[57] ABSTRACT

The invention is a method for obtaining observables for input to a Kalman filter process which determines the attitude (roll, pitch, and heading) of a platform. The invention utilizes an inertial measurement unit (IMU) attached to the platform and an associated processor, a plurality of signal receiving antennas attached to the platform, and a plurality of satellite transmitters. The heading of the platform as determined by the IMU and its associated processor by themselves can be significantly in error. A comparison of the values of an attitude-sensitive function of the ranges from the platform antennas to different groupings of satellite transmitters obtained first by using IMU data and second by using the measured phases of the satellite-transmitter signals received at the platform antennas, a very accurate value for the range function is obtained. This accurate value of the range function is used in a Kalman filter process to obtain very accurate values for platform attitude.

40 Claims, 14 Drawing Sheets

$\bar{S}_1 = \bar{U}_1 + \bar{p}_{11} = \bar{U}_2 + \bar{p}_{21}, \quad \bar{U}_1 = \bar{U}_0 + \bar{L}_1;$
$\bar{S}_2 = \bar{U}_1 + \bar{p}_{12} = \bar{U}_2 + \bar{p}_{22}, \quad \bar{U}_2 = \bar{U}_0 + \bar{L}_1 + \bar{L}_2.$ $$P = \rho + c(dt - dT) + dion + dtrop$$

P : pseudo-range
 $\rho$ : true range
 dt : satellite clock error
 dT: receiver clock error
 dion : ionospheric effect
 dtrop: tropospheric effect

FIG. 4

$$\Phi = \rho + c(dt - dT) + \lambda N + dion + dtrop$$

$\Phi$ : carrier phase observation
 $\rho$ : true range
 $\lambda$ : carrier wavelength, 19 cm for $L_1$ carrier
 N : initial integer ambiguity
 dt : satellite clock error
 dT: receiver clock error
 dion : ionospheric effect
 dtrop: tropospheric effect

FIG. 5

Clock Errors Elimination $$\Phi_{12} = \rho_{12} + c(dt_2 - dT_1) - dion12 + dtrop12 + \lambda N12$$

$$\Phi_{21} = \rho_{21} + c(dt_1 - dT_2) - dion21 + dtrop21 + \lambda N21$$

$$\Phi_{11} = \rho_{11} + c(dt_1 - dT_1) - dion11 + dtrop11 + \lambda N11$$

$\Phi_{12} - \Phi_{11}$ = difference between satellites $\Rightarrow dT_1$ cancelled $\Phi_{21} - \Phi_{11}$ = difference between receivers $\Rightarrow dt_1$ cancelled

FIG. 6

$$DD\Phi = (\Phi_{22} - \Phi_{21}) - (\Phi_{12} - \Phi_{11}) = \nabla\Phi_2 - \nabla\Phi_1 = \Delta\nabla\Phi$$

= 2 differences between satellites followed by 1 difference between receivers $$= (\Phi_{22} - \Phi_{12}) - (\Phi_{21} - \Phi_{11}) = \Delta\Phi_2 - \Delta\Phi_1 = \nabla\Delta\Phi$$

= 2 differences between receivers followed by 1 difference between satellites

FIG. 7

$$DD\Phi = (\rho_{22} - \rho_{21} - \rho_{12} + \rho_{11})$$
$$+$$
$$\lambda(N22 - N21 - N12 + N11)$$
$$-$$
$$[(dion22 - dion12) + (dion11 - dion21)]$$
$$+$$
$$(dtrop22 - dtrop12) + (dtrop11 - dtrop21)$$

FIG. 8

$$DD\rho \equiv \rho_{22} - \rho_{21} - \rho_{12} + \rho_{11}$$
(true double - differenced range)

$$(DD\rho)_m \equiv DD\Phi - \lambda(N22 - N21 - N12 + N11)$$
(measured double - differenced range)

$$(DD\rho)_c \equiv p_{22} - p_{21} - p_{12} + p_{11}$$
(computed double - differenced range, $p_{ij}$ is the computed range from rcvr i to sat j)

FIG. 9

$$z = (DD\rho)_c - DD\Phi = (DD\rho)_c - (DD\rho)_m$$

$$= [(DD\rho)_c - DD\rho] - [(DD\rho)_m - DD\rho]$$

$$= (\delta DD\rho)_c - (\delta DD\rho)_m$$

$$= H\tilde{x} + \eta$$

$H$ = Observation matrix
$\tilde{x}$ = Kalman state residuals
$\eta$ = noise

FIG. 12

$$(\delta DD\rho)_c = (DD\rho)_c - DD\rho$$
$$= (p_{22} - p_{21} - p_{12} + p_{11}) - (\rho_{22} - \rho_{21} - \rho_{12} + \rho_{11})$$

$$p_{ij} - \rho_{ij} = \sqrt{\bar{p}_{ij} \cdot \bar{p}_{ij}} - \sqrt{\bar{\rho}_{ij} \cdot \bar{\rho}_{ij}} =$$

$$\sqrt{(\bar{S}_j + d\bar{S}_j - \bar{U}_i - d\bar{U}_i) \cdot (\bar{S}_j + d\bar{S}_j - \bar{U}_i - d\bar{U}_i)} - \sqrt{(\bar{S}_j - \bar{U}_i) \cdot (\bar{S}_j - \bar{U}_i)} =$$

$$\sqrt{[(\bar{S}_j - \bar{U}_i) + (d\bar{S}_j - d\bar{U}_i)] \cdot [(\bar{S}_j - \bar{U}_i) + (d\bar{S}_j - d\bar{U}_i)]} - \sqrt{(\bar{S}_j - \bar{U}_i) \cdot (\bar{S}_j - \bar{U}_i)} =$$

$$\sqrt{(\bar{S}_j - \bar{U}_i) \cdot (\bar{S}_j - \bar{U}_i) + 2(\bar{S}_j - \bar{U}_i) \cdot (d\bar{S}_j - d\bar{U}_i) + 0(2)} - \sqrt{(\bar{S}_j - \bar{U}_i) \cdot (\bar{S}_j - \bar{U}_i)}$$

$$\approx [2(\bar{S}_j - \bar{U}_i) \cdot (d\bar{S}_j - d\bar{U}_i)] / (2\rho_{ij})$$

$$= (\bar{S}_j - \bar{U}_i) \cdot (d\bar{S}_j - d\bar{U}_i) / \rho_{ij} = \bar{\rho}_{ij} \cdot (d\bar{S}_j - d\bar{U}_i) / \rho_{ij}$$

FIG. 13

$$(\delta DD\rho)_c = \sum_{i=1}^{2} \sum_{j=1}^{2} (-1)^{(i+j)} (\bar{S}_j - \bar{U}_i) \cdot (d\bar{S}_j - d\bar{U}_i)/\rho_{ij}$$

$$= \sum_{i=1}^{2} \sum_{j=1}^{2} (-1)^{(i+j)} \overline{p}_{ij} \cdot (d\bar{S}_j - d\bar{U}_i)/\rho_{ij}$$

where $p_{ij} = \sqrt{(\bar{S}_j + d\bar{S}_j - \bar{U}_i - d\bar{U}_i) \cdot (\bar{S}_j + d\bar{S}_j - \bar{U}_i - d\bar{U}_i)}$ and $\rho_{ij} = \sqrt{(\bar{S}_j - \bar{U}_i) \cdot (\bar{S}_j - \bar{U}_i)}$ for $i, j = 1, 2$.

FIG. 14

$S_{1n} = C_f^n \cdot S_{1f} = U_{0n} + L_{1n} + \rho_{11n} = U_{0n} + L_{1n} + L_{2n} + \rho_{21n}$ $S_{2n} = C_f^n \cdot S_{2f} = U_{0n} + L_{1n} + \rho_{12n} = U_{0n} + L_{1n} + L_{2n} + \rho_{22n}$ where $C_f^n$ is transformation from ECEF to NAV with $d(C_f^n) = [\delta\theta] \cdot C_f^n$ (see next chart for derivation)

$dS_{1n} = [\delta\theta] \cdot S_{1n} + C_f^n \cdot dS_{1f}$ $dS_{2n} = [\delta\theta] \cdot S_{2n} + C_f^n \cdot dS_{2f}$

FIG. 15

$C_f^c = [I + \delta\theta] \cdot C_f^n$ $d(C_f^n) = C_f^c - C_f^n = [\delta\theta] \cdot C_f^n$ ECEF $\xrightarrow{C_f^n}$ NAV $\xrightarrow{[I+\delta\theta]}$ COMPUTER ECEF $\xrightarrow{C_f^c}$ COMPUTER

FIG. 16

Express $U_1, U_2, dU_1, dU_2$ as:

$U_{1n} = U_{0n} + C_b^n \cdot L_{1b}$ where $C_b^n$ is transformation from BODY to NAV $U_{2n} = U_{0n} + C_b^n \cdot (L_{1b} + L_{2b})$ with $d(C_b^n) = [\phi] \cdot C_b^n$ (attitude error effect)

$dU_{1n} = dU_{0n} + [\phi] \cdot L_{1n} + C_b^n \cdot dL_{1b}$ $dU_{2n} = dU_{0n} + [\phi] \cdot (L_{1n} + L_{2n}) + C_b^n \cdot (dL_{1b} + dL_{2b})$

FIG. 17

$(\delta DD\rho)_c =$ $\rho_{11n} \cdot \{[\delta\theta] \cdot U_{0n} + C_f^n \cdot dS_{1f} - dU_{0n} - [\psi] \cdot L_{1n} - C_b^n \cdot dL_{1b}\}/\rho_{11}$ $-\rho_{12n} \cdot \{[\delta\theta] \cdot U_{0n} + C_f^n \cdot dS_{2f} - dU_{0n} - [\psi] \cdot L_{1n} - C_b^n \cdot dL_{1b}\}/\rho_{12}$ $-\rho_{21n} \cdot \{[\delta\theta] \cdot U_{0n} + C_f^n \cdot dS_{1f} - dU_{0n} - [\psi] \cdot (L_{1n} + L_{2n}) - C_b^n \cdot (dL_{1b} + dL_{2b})\}/\rho_{21}$ $+\rho_{22n} \cdot \{[\delta\theta] \cdot U_{0n} + C_f^n \cdot dS_{2f} - dU_{0n} - [\psi] \cdot (L_{1n} + L_{2n}) - C_b^n \cdot (dL_{1b} + dL_{2b})\}/\rho_{22}$ where $\psi = \phi - \delta\theta$

FIG. 18

$$[\delta\theta] = \begin{vmatrix} 0 & \delta\theta_z & -\delta\theta_y \\ -\delta\theta_z & 0 & \delta\theta_x \\ \delta\theta_y & -\delta\theta_x & 0 \end{vmatrix}, \quad [\phi] = \begin{vmatrix} 0 & \phi_z & -\phi_y \\ -\phi_z & 0 & \phi_x \\ \phi_y & -\phi_x & 0 \end{vmatrix}$$

$$C_f^n = \begin{vmatrix} C_{f11}^n & C_{f12}^n & C_{f13}^n \\ C_{f21}^n & C_{f22}^n & C_{f23}^n \\ C_{f31}^n & C_{f32}^n & C_{f33}^n \end{vmatrix}, \quad C_b^n = \begin{vmatrix} C_{b11}^n & C_{b12}^n & C_{b13}^n \\ C_{b21}^n & C_{b22}^n & C_{b23}^n \\ C_{b31}^n & C_{b32}^n & C_{b33}^n \end{vmatrix}$$

$$H_1 = -(L_{2zn}\nabla\rho_{2yn} - L_{2yn}\nabla\rho_{2zn}) - (L_{1zn}\nabla\Delta\rho_{yn} - L_{1yn}\nabla\Delta\rho_{zn})$$
$$H_2 = -(L_{2xn}\nabla\rho_{2zn} - L_{2zn}\nabla\rho_{2xn}) - (L_{1xn}\nabla\Delta\rho_{zn} - L_{1zn}\nabla\Delta\rho_{xn})$$
$$H_3 = -(L_{2yn}\nabla\rho_{2xn} - L_{2xn}\nabla\rho_{2yn}) - (L_{1yn}\nabla\Delta\rho_{xn} - L_{1xn}\nabla\Delta\rho_{yn})$$
$$H_4 = -H_1 + (a+h) \cdot \nabla\Delta\rho_{yn}$$
$$H_5 = -H_2 - (a+h) \cdot \nabla\Delta\rho_{xn}$$
$$H_6 = -H_3$$
$$H_7 = -\nabla\Delta\rho_{zn}$$
$$H_8 = -\nabla\rho_{2xn}C^n_{b11} - \nabla\rho_{2yn}C^n_{b21} - \nabla\rho_{2zn}C^n_{b31}$$
$$H_9 = -\nabla\rho_{2xn}C^n_{b12} - \nabla\rho_{2yn}C^n_{b22} - \nabla\rho_{2zn}C^n_{b32}$$
$$H_{10} = -\nabla\rho_{2xn}C^n_{b13} - \nabla\rho_{2yn}C^n_{b23} - \nabla\rho_{2zn}C^n_{b33}$$
$$H_{11} = -\nabla\Delta\rho_{xn}C^n_{b11} - \nabla\Delta\rho_{yn}C^n_{b21} - \nabla\Delta\rho_{zn}C^n_{b31}$$
$$H_{12} = -\nabla\Delta\rho_{xn}C^n_{b12} - \nabla\Delta\rho_{yn}C^n_{b22} - \nabla\Delta\rho_{zn}C^n_{b32}$$
$$H_{13} = -\nabla\Delta\rho_{xn}C^n_{b13} - \nabla\Delta\rho_{yn}C^n_{b23} - \nabla\Delta\rho_{zn}C^n_{b33}$$
$$H_{14} = -\Delta\rho_{1xn}C^n_{f11} - \Delta\rho_{1yn}C^n_{f21} - \Delta\rho_{1zn}C^n_{f31}$$
$$H_{15} = -\Delta\rho_{1xn}C^n_{f12} - \Delta\rho_{1yn}C^n_{f22} - \Delta\rho_{1zn}C^n_{f32}$$
$$H_{16} = -\Delta\rho_{1xn}C^n_{f13} - \Delta\rho_{1yn}C^n_{f23} - \Delta\rho_{1zn}C^n_{f33}$$
$$H_{17} = -\Delta\rho_{2xn}C^n_{f11} - \Delta\rho_{2yn}C^n_{f21} - \Delta\rho_{2zn}C^n_{f31}$$
$$H_{18} = -\Delta\rho_{2xn}C^n_{f12} - \Delta\rho_{2yn}C^n_{f22} - \Delta\rho_{2zn}C^n_{f32}$$
$$H_{19} = -\Delta\rho_{2xn}C^n_{f13} - \Delta\rho_{2yn}C^n_{f23} - \Delta\rho_{2zn}C^n_{f33}$$

FIG. 21

|  | symbol | # of states | frame |
|---|---|---|---|
| Attitude | $(\phi)$ | 3 | NAV |
| Level Position | $(\delta\theta_{x,y})$ | 2 | NAV |
| Computer Azimuth | $(\delta\theta_z)$ | 1 | NAV |
| Altitude | $(dh)$ | 1 | NAV |
| Lever arm 2 | $(dL_{2b})$ | 3 | BODY |
| Lever arm 1 | $(dL_{1b})$ | 3** | BODY |
| Satellite 1 position | $(dS_{1f})$ | 3** | ECEF |
| Satellite 2 position | $(dS_{2f})$ | 3** | ECEF |
|  |  | 19 |  |

** small/negligible contributors

FIG. 22

$$\Delta \bar{p}_1 = \bar{p}_{21}/p_{21} - \bar{p}_{11}/p_{11} = [\Delta p_{1xn}, \Delta p_{1yn}, \Delta p_{1zn}]' = \Delta p_{1n}$$

$$\Delta \bar{p}_2 = \bar{p}_{22}/p_{22} - \bar{p}_{12}/p_{12} = [\Delta p_{2xn}, \Delta p_{2yn}, \Delta p_{2zn}]' = \Delta p_{2n}$$

$$\nabla \bar{p}_2 = \bar{p}_{22}/p_{22} - \bar{p}_{21}/p_{21} = [\nabla p_{2xn}, \nabla p_{2yn}, \nabla p_{2zn}]' = \nabla p_{2n}$$

$$\nabla \Delta \bar{p} = \Delta \bar{p}_2 - \Delta \bar{p}_1 = [\nabla \Delta p_{xn}, \nabla \Delta p_{yn}, \nabla \Delta p_{zn}]' = \nabla \Delta p_n$$

FIG. 23

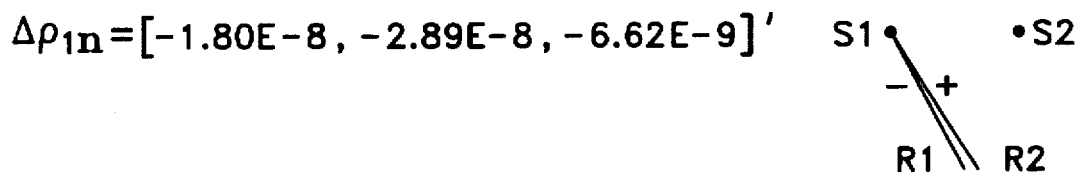

$\Delta p_{1n} = [-1.80E-8, -2.89E-8, -6.62E-9]'$

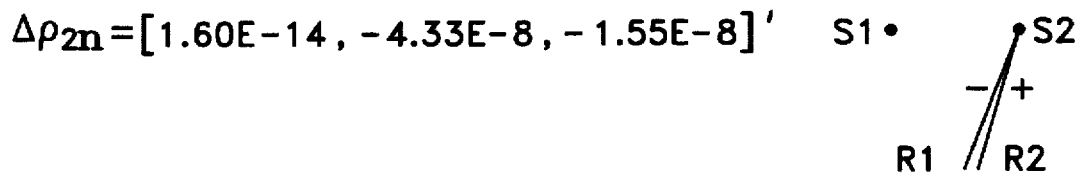

$\Delta p_{2n} = [1.60E-14, -4.33E-8, -1.55E-8]'$

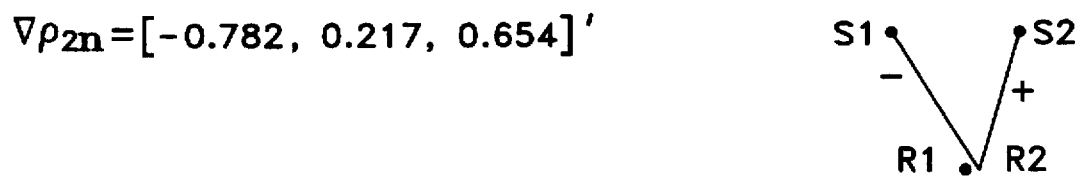

$\nabla p_{2n} = [-0.782, 0.217, 0.654]'$

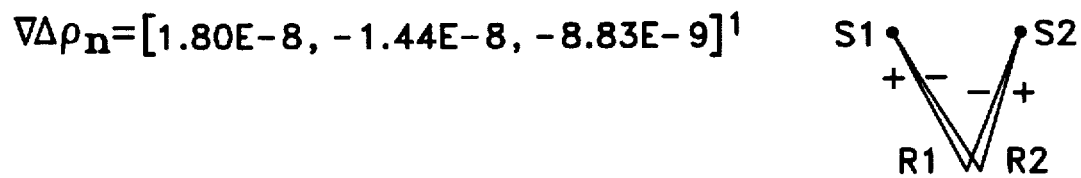

$\nabla \Delta p_n = [1.80E-8, -1.44E-8, -8.83E-9]'$

FIG. 24

$$H_1 = -(L_{2zn}\nabla\rho_{2yn} - L_{2yn}\nabla\rho_{2zn}) - (L_{1zn}\nabla\Delta\rho_{yn} - L_{1yn}\nabla\Delta\rho_{zn})$$

$$H_2 = -(L_{2xn}\nabla\rho_{2zn} - L_{2zn}\nabla\rho_{2xn}) - (L_{1xn}\nabla\Delta\rho_{zn} - L_{1zn}\nabla\Delta\rho_{xn})$$

$$H_3 = -(L_{2yn}\nabla\rho_{2xn} - L_{2xn}\nabla\rho_{2yn}) - (L_{1yn}\nabla\Delta\rho_{xn} - L_{1xn}\nabla\Delta\rho_{yn})$$

$$H_4 = -H_1 + (a+h) \cdot \nabla\Delta\rho_{yn}$$

$$H_5 = -H_2 - (a+h) \cdot \nabla\Delta\rho_{xn}$$

$$H_6 = -H_3$$

$$H_7 = -\nabla\Delta\rho_{zn}$$

$$H_8 = -\nabla\rho_{2xn}C^n_{b11} - \nabla\rho_{2yn}C^n_{b21} - \nabla\rho_{2zn}C^n_{b31}$$

$$H_9 = -\nabla\rho_{2xn}C^n_{b12} - \nabla\rho_{2yn}C^n_{b22} - \nabla\rho_{2zn}C^n_{b32}$$

$$H_{10} = -\nabla\rho_{2xn}C^n_{b13} - \nabla\rho_{2yn}C^n_{b23} - \nabla\rho_{2zn}C^n_{b33}$$

FIG. 25

| STATES | SYMBOL | NUMBER OF STATES |
|---|---|---|
| LEVEL POSITION | $\delta\theta_{x,y}$ | 2 |
| COMPUTER AZIMUTH | $\delta\theta_z$ | 1 |
| VELOCITY | $\delta V$ | 3 |
| ATTITUDE | $\delta\phi$ | 3 |
| ALTITUDE | $\delta H$ | 1 |
| ACCELEROMETER | | |
|   BIAS | $\nabla$ | 3 |
|   SCALE FACTOR | $\nabla_{sf}$ | 3 |
|   MISALIGNMENT | $\nabla_m$ | 6 |
| GYRO | | |
|   BIAS | $\varepsilon$ | 3 |
|   SCALE FACTOR | $\varepsilon_{sf}$ | 3 |
|   MISALIGNMENT | $\varepsilon_m$ | 3 |
| BAROMETRIC ALTIMETER | | |
|   BIAS | B | 1 |
|   SCALE FACTOR | $B_{sf}$ | 1 |
| GPS USER CLOCK | | |
|   PHASE | SVC | 1 |
|   FREQUENCY | SVF | 1 |
| LEVER ARM | $\delta L$ | 6 |
| | | 41 |

FIG. 26

$$D\rho \equiv \rho_{21} - \rho_{11}$$
(true single - differenced range)

$$(D\rho)_m \equiv D\Phi - \lambda(N21 - N11)$$
(measured single - differenced range)

$$(D\rho)_c \equiv P_{21} - P_{11}$$
(computed single - differenced range, $p_{ij}$ is the computed range from rcvr i to sat j)

ATTITUDE DETERMINATION UTILIZING AN INERTIAL MEASUREMENT UNIT AND A PLURALITY OF SATELLITE TRANSMITTERS

BACKGROUND OF INVENTION

This invention relates generally to satellite-inertial navigation systems and more particularly to methods and apparatus for determining the attitude of a platform in a satellite-inertial navigation environment. The use of "satellite" is meant to include not only earth-circling satellites of all varieties but also other forms of platforms that can be cooperatively used in establishing the position and attitude of a platform that carries an inertial navigation system.

The Global Positioning System (GPS), the current exemplar of an earth-orbiting satellite navigation system, consists of 24 globally-dispersed satellites with synchronized atomic clocks. Each satellite transmits a coded signal having the satellite clock time embedded in the signal and carrying information concerning the emphemerides of the satellites and its own daily emphemeris and clock corrections. A user obtains the essential data for determining his position and clock error by measuring the differences in his receiver clock time and the satellite clock times embedded in the signals from at least four viewable satellites. The difference in receiver clock time and satellite clock time multiplied by the radio wave propagation velocity is called the pseudorange and is equal to the range to the satellite plus the incremental range equivalent of satellite clock error minus the receiver clock error.

The user also obtains the essential data for determining his velocity by measuring for each satellite the difference in the frequency of the actual satellite signal and the frequency of the satellite signal if it had been generated using the receiver clock. The accumulated change in phase over a fixed period of time resulting from this frequency difference expressed in units of distance is called the delta range and is equal to the change in satellite range over the fixed period of time plus the change in the difference in the receiver and satellite clocks over the same fixed period of time multiplied by the radio wave propagation velocity.

The user, knowing the positions, velocities, and clock errors of the satellites, can compute his own position, velocity, and clock error from the measured pseudoranges and delta ranges.

Since the more significant errors in GPS-determined positions of nearby platforms are highly correlated, these errors tend to cancel out in determining the relative positions of the platforms. The use of GPS for making highly-accurate relative position determinations of nearby platforms is referred to as differential GPS.

The accuracy attainable with differential GPS suggests the use of interferometric GPS for determining the attitude of a platform. Interferometric GPS denotes the use of satellite signal carrier phase measurements at different points on a platform for accurately determining the orientation of the platform (and the other Kalman states) from highly-accurate position updates.

The use of three spatially-distributed antennas on a platform permits the accurate determination with GPS signals alone of pitch, roll, and heading. However, if the platform is a highly-maneuverable aircraft, it becomes necessary to integrate the platform GPS equipment with an inertial navigation unit. GPS compensates for inertial navigation system drifts and when platform maneuvering or other occurrences causes GPS to become temporarily inoperative, the inertial navigation system (INS) carries on until the GPS again becomes operative.

SUMMARY OF THE INVENTION

The invention is a method and apparatus which practices the method for obtaining observables for input to a Kalman filter process which determines the roll, pitch, and heading of a platform. The invention utilizes an inertial measurement unit (IMU) attached to the platform and an associated processor, a plurality of signal receiving antennas attached to the platform, and a plurality of satellite transmitters. The platform has a reference point to which the IMU is referenced, and the antennas have known locations relative to the platform reference point. The method is repeatedly executed at time intervals called method intervals. The Kalman filter process supplies roll, pitch, and heading corrections to the IMU and its associated processor at time intervals called Kalman filter intervals, a Kalman filter interval being a multiple of the method interval.

The first step of the method is determining the value of a phase function for each of a plurality of satellite transmitter groups consisting of one or more satellite transmitters. A phase function is a function of the phases of the signals received from the satellite transmitters in a satellite transmitter group at the plurality of antennas.

The second step is obtaining the pitch, roll, and heading of the platform from the IMU and its associated processor, the heading being called the IMU heading.

The third step is determining the value of a computed range function for each satellite transmitter group and for each of a plurality of candidate headings. A range function is a function of the ranges of the satellite transmitters in a satellite transmitter group to the plurality of antennas, the ranges for the computed range function being determined from ranges calculated from the locations of the satellite transmitters, the location of the platform reference point, the locations of the antennas relative to the platform reference point, the pitch and roll of the platform, and a candidate heading. The plurality of candidate headings span the range of headings from the IMU heading minus a first value to the IMU heading plus a second value.

The fourth step is determining the value of an integer function for each satellite transmitter group and for each candidate heading, the integer function being the difference in the computed range function and the phase function rounded to the nearest integer.

The fifth step is determining the value of a measured range function for each satellite-transmitter group and for each candidate heading. A measured range function is the sum of the phase function and the integer function.

The sixth step is eliminating candidate headings from further consideration under certain conditions, the conditions being that a first set of one or more quality requirements is specified and the candidate headings fail to satisfy the first set of quality requirements.

The seventh step is determining a refined candidate heading for each of one or more evaluation intervals for each of the remaining candidate headings utilizing the values of the measured range function for the satellite transmitter groups obtained during each of one or more evaluation intervals, an evaluation interval including the present method interval and zero or more prior method intervals. A refined candidate heading is the heading for which a quality measure is highest.

The eighth step is eliminating particular candidate headings from further consideration under certain conditions, the conditions being that a second set of one or more quality requirements is specified and the refined headings associated with the particular candidate headings fail to satisfy the second set of quality requirements.

The ninth step is discarding the data associated with a candidate heading for prior method intervals under certain conditions, the conditions being that a third set of one or more quality requirements is specified and the refined headings associated with the candidate heading fail to satisfy the third set of quality requirements.

The tenth and final step is declaring a candidate heading associated with a refined heading to be the correct candidate heading under certain conditions, the conditions being that a fourth set of one or more quality requirements is specified and the refined heading satisfies the fourth set of quality requirements, the range function residuals being made available to the Kalman process. A range function residual is the difference in values of a computed range function and the corresponding measured range function associated with the refined heading associated with the correct candidate heading.

BRIEF DESCRIPTION OF THE DRAWINGS

FIG. 4 gives the mathematical definition of pseudorange.

FIG. 5 gives the mathematical definition of the carrier phase observation.

FIG. 6 shows how clock errors can be eliminated by taking single differences in phase.

FIG. 7 shows how two ways of double differencing give the same result.

FIG. 8 expands the phase double-difference into its component parts.

FIG. 9 contains definitions of terms that are used later in the mathematical development.

FIG. 12 defines the observation z which leads to a minimal mean-square-error estimate of platform attitude.

FIG. 13 shows how the linearization of $P_{ij}-\rho_{ij}$ is accomplished.

FIG. 14 shows a linearized version of the first equation of FIG. 13.

FIG. 15 shows how the S and dS vectors of FIG. 14 are transformed from ECEF to NAV coordinates.

FIG. 16 shows the relationships among the ECEF, NAV, and COMPUTER frames of reference.

FIG. 17 shows how the U and dU vectors of FIG. 14 are transformed from ECEF to NAV coordinates.

FIG. 18 shows the equation obtained by substituting the equations of FIGS. 15 and 17 in the equation of FIG. 14.

FIG. 19 defines the matrix components appearing in FIG. 18.

FIG. 20 defines the vector components appearing in FIG. 18.

FIG. 21 shows the components of the observation matrix.

FIG. 22 identifies the Kalman states that are associated with the double-difference observation matrix.

FIG. 23 defines the abbreviations used in FIG. 21.

FIG. 24 gives the relative magnitudes of the quantities listed in FIG. 23.

FIG. 25 shows the components of the simplified observation matrix.

FIG. 26 identifies the Kalman states used in the simulation for the system illustrated in FIG. 10.

DESCRIPTION OF THE PREFERRED EMBODIMENT

Figure 1:
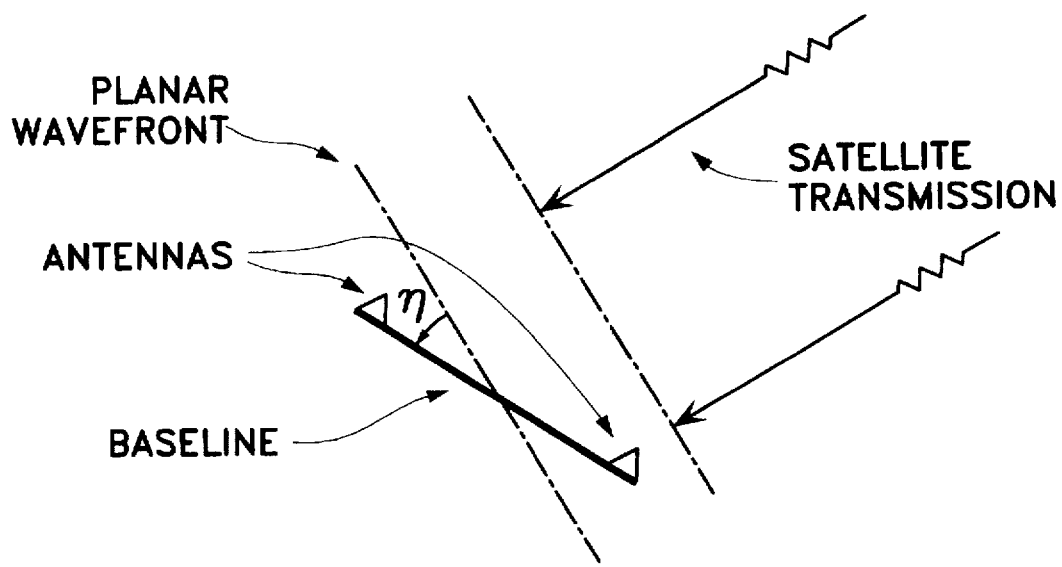
FIG. 1 illustrates the basis for attitude determination in the GPS environment.

The preferred embodiment of the present invention utilizes a fully-integrated combination of interferometric GPS and a low-cost inertial navigation system (INS) to provide attitude as part of the INS solution. The basis for attitude determination in the GPS environment is illustrated in FIG. 1 which shows wavefronts associated with a satellite transmission incident on two antennas that are endpoints of a baseline. The difference in satellite signal phase at the two ends of the baseline provides the means for calculating the angle between the baseline and the satellite signal wavefront in the plane of the antennas and the satellite being observed.

In the customary use of this approach, the carrier phase obtained at each antenna is differenced for two satellite signals at each time point and these differences are then further (second) differenced between the two antennas to remove unknown progagation path effects, the satellite clock errors, and any unknown pertubations of the GPS satellite orbits. It is this differencing that results in the extremely low noise receiver phase measurement allowing the baseline angle to be determined with high accuracy.

The difference in satellite signal phase for two satellites provides the means for calculating heading which, when integrated with an INS, is sufficient for determining the attitude of the antenna baseline and the platform which carries the antennas.

Figure 2:
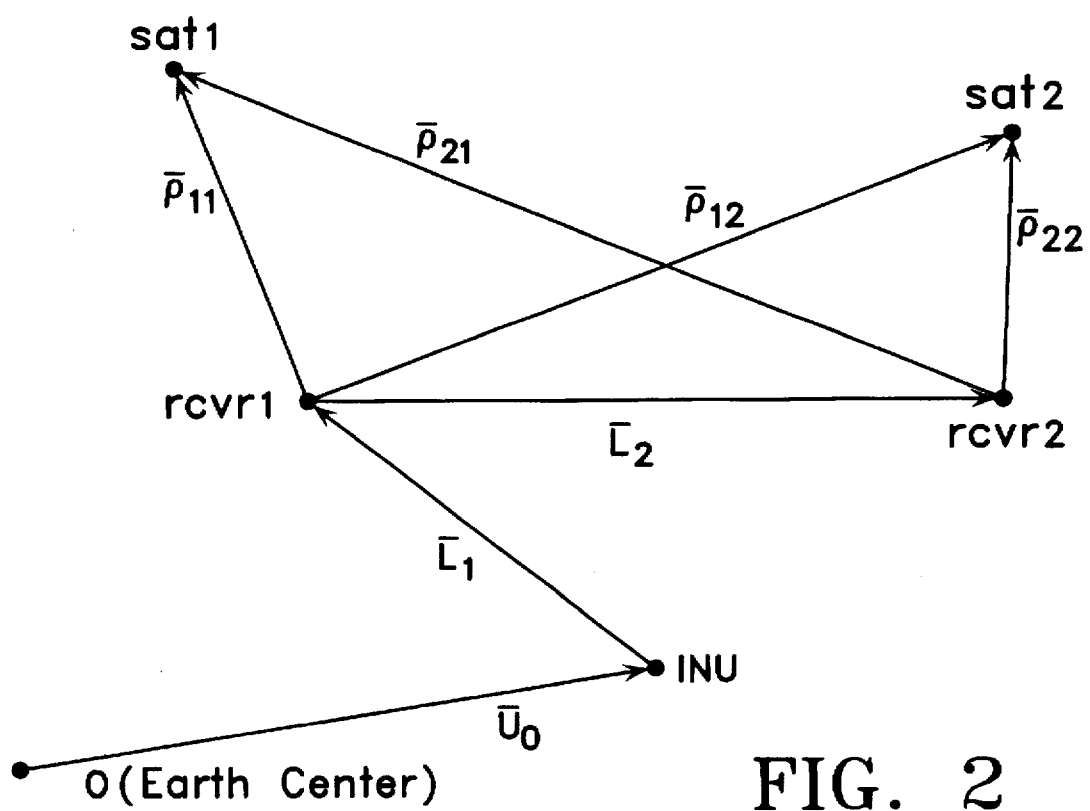
FIG. 2 defines the attitude determination geometry in terms of earth center, the inertial navigation unit position, the positions of two receiving points for satellite signals, and the positions of two satellites.

The geometry is shown in FIG. 2. The locations of the inertial navigation unit (INU), the two antennas associated with the two receivers rcvr1 and rcvr2 for measuring pseudorange, delta range, and carrier phase, and the two satellites sat1 and sat2 are defined relative to earth center O by the vectors shown in the figure.

Figure 3:
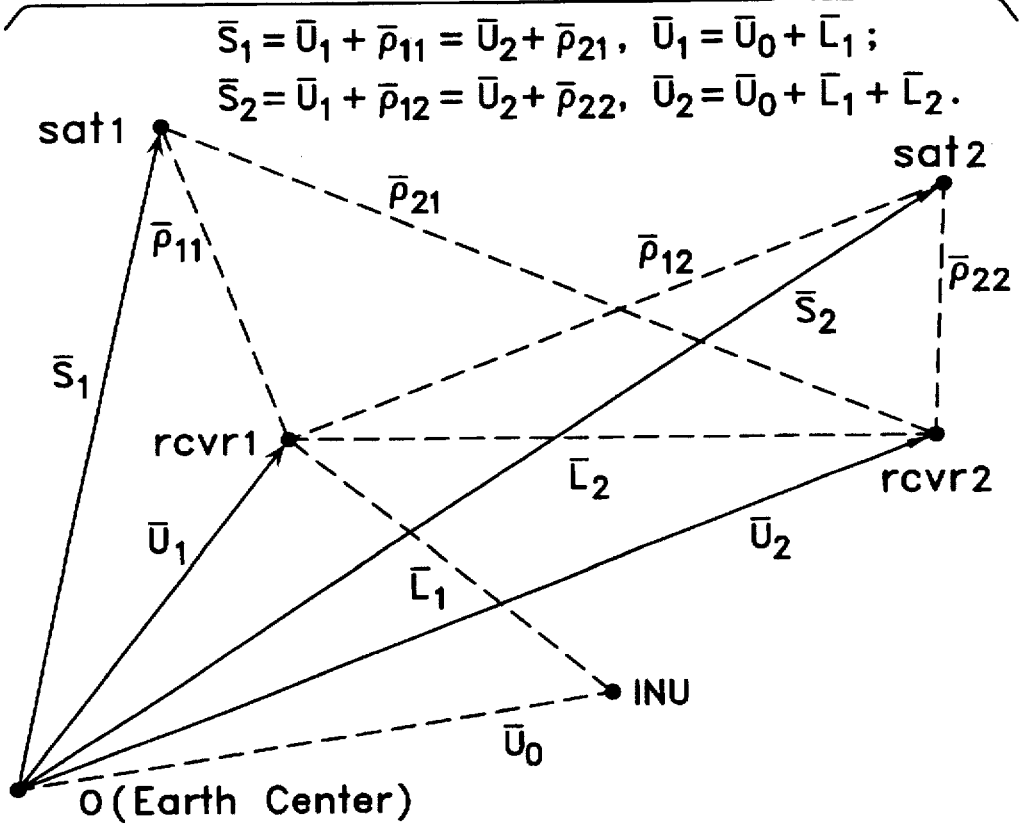
FIG. 3 expands the attitude determination geometry of FIG. 2 to include vectors which specify the locations of the two receiving points and the two satellites with respect to earth center.

The geometry of FIG. 2 is further defined in FIG. 3 with the addition of vectors which specify the locations of the two receiving points rcvr1 and rcvr2 and the two satellites sat1 and sat2 with respect to the earth's center O. At the top of the figure, these four vectors are defined in terms of other vectors in the figure.

The mathematical definitions of pseudorange and carrier phase are defined in FIGS. 4 and 5.

It is shown in FIG. 6 how clock errors can be eliminated by taking single differences in phase. The differencing of the phases of the signals received from two satellites by one receiver removes the receiver clock error that appears in both phases. The differencing of the phases of the signals received by two receivers from the same satellite removes the satellite clock error that appears in both phases.

It is shown in FIG. 7 how two ways of double differencing give the same result. In other words, the process of double differencing is commutative.

The phase double-difference of FIG. 7 is expanded into its component parts (see FIG. 6) in FIG. 8. The terms reflecting the effects of the troposphere and the ionosphere tend to cancel since each pair in parentheses corresponds to signals from a common satellite which travel through the same region of space in arriving at the two receiving points.

Some definitions of terms which will appear in the paragraphs that follow are given in FIG. 9. Equation E1 defines the true double-differenced range. Equation E2 defines the measured double-differenced range in terms of the double-differenced phase DD$\Phi$ and the double-differenced integer DDN (=−N22+N21+N12−N11). Equation E3 defines the computed double-differenced range which is obtained from the locations of the receiving points and the satellites.

Equation E2 expresses the fundamental double-differenced phase observable. It applies to any pair of satellites. For M satellites, there are M-1 equations, each in the form of E2. Thus, there are M-1 observables for updating attitude, but there are also M-1 double-differenced integers DDN to be determined.

It is well-known that integers can be resolved without the use of IMU data. The known distance between the two antennas (i.e. receiving points) provides a strong constraint, thus limiting the possible integers to those solutions placing the second antenna on a surface of a sphere of this radius. Typically, four satellites are required, providing three measured double-differenced range equations E2 involving three unknown double-differenced integers DDN.

When the data provided by an IMU is added to the problem, the search space is much more severely constrained. The pitch and roll error of the IMU tends to be on the order of 1 mr. This error, for an antenna spacing of 1 m, produces only a 1-mm error, which is negligible insofar as determining double-differenced integers is concerned. Since the distance between antennas is known, the only missing information to completely specifying the position of the second antenna relative to the first is the direction of the second antenna from the first. Even though the direction of the second antenna is accurately specified with respect to the platform heading, the platform one-sigma heading error of possibly 10 degrees (1 degree/hr east gyro bias at 70-degree latitude) translates directly into a second-antenna one-sigma directional error of 10 degrees. An uncertainty in direction of the second antenna which results in a one-cycle uncertainty in the single-differenced phase can result in a two-cycle uncertainty in the double-differenced phase. To determine the double-differenced integer unambiguously requires that the uncertainty in direction of the second antenna translates into a double-differenced phase uncertainty no greater than one-half cycle and a single-differenced phase uncertainty no greater than one-quarter cycle. Since the GPS L1 wavelength is approximately 0.19 m, a one-quarter cycle single-differenced phase uncertainty (0.19/4 m) is equivalent to a second antenna directional uncertainty of 2.7 degrees. Thus, the directional uncertainty of the second antenna that can be tolerated for unambiguous double-differenced integer determination is exceeded by a factor of almost four by the directional uncertainty resulting from the platform heading uncertainty. Consequently, platform heading does not lead directly to an unambiguous determination of the double-differenced integers.

Figure 10:
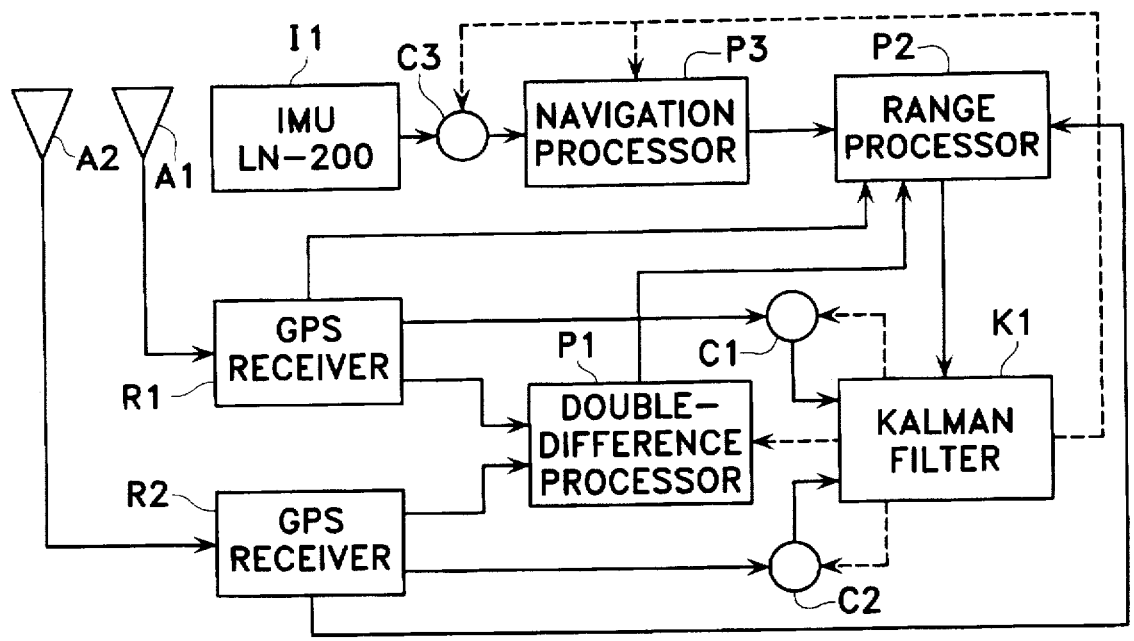
FIG. 10 shows a block diagram of the preferred embodiment of the invention.

A block diagram of the preferred embodiment of the invention is shown in FIG. 10. Antennas A1 and A2 feed signals from at least two satellites and preferably from all viewable satellites to the two GPS receivers R1 and R2.

The GPS receiver R1 supplies to combiner C1 measured pseudoranges and delta ranges associated with a plurality of viewable satellites. The Kalman filter K1 supplies to combiner C1 (via the dashed line) computed user clock error and user clock rate error which are subtracted from the pseudoranges and delta ranges respectively in the combiner C1. The resulting User Clock Adjusted (RCA) pseudoranges and UCA delta ranges are supplied by the combiner C1 to the Kalman filter K1.

The GPS receiver R2 supplies to combiner C2 measured pseudoranges and delta ranges which are transformed in combiner C2 into UCA pseudoranges and UCA delta ranges and supplied to the Kalman filter K1 in the same way as the GPS receiver R1 quantities.

The GPS receivers R1 and R2 supply the measured carrier phases $\Phi_{1i}$ and $\Phi_{2i}$ respectively of the signals they receive from the viewable satellites to the double-difference processor P1, i taking on the values associated with the viewable satellites.

The double-difference processor P1 obtains the measured phase double-difference $(DD\Phi)_{ij}=[(\Phi_{2i}-\Phi_{2j})-(\Phi_{1i}-\Phi_{1j})]$, corrects it with data supplied by the Kalman filter K1 (via the dashed line), and supplies the corrected phase double-difference to the range processor P2.

The GPS receivers R1 and R2 extract satellite ephemeris data, satellite clock and clock rate errors, and synchronization data from the satellite signals and supply this data to range processor P2.

The inertial measurement unit (IMU) I1, a Litton LN-200 model, supplies to combiner C3 platform acceleration measured by accelerometers fixed to the platform and platform angular rotation rate measured by gyros also fixed to the platform. This data is corrected in combiner C3 for accelerometer and gyro bias, scale factor error, and misalignment using data supplied via the dashed line by the Kalman filter K1. The corrected data is supplied by the combiner C3 to the navigation processor P3.

A barometric altimeter, not shown in FIG. 10, is used to provide a platform altitude input through combiner C3 to the navigation processor P3. Corrections for altimeter bias and scale factor errors are supplied to the combiner by the Kalman filter Kl. The navigation processor P3 uses the platform acceleration, angular rotation rate, and altitude to periodically compute the position, velocity, and attitude of the platform. These quantities are corrected with data supplied by the Kalman filter K1 (via the dashed line), and the corrected data is passed on to the range processor P2.

The range processor P2 uses this corrected data together with satellite ephemeris data to obtain computed ranges and delta ranges. The range processor P2 subtracts satellite clock error from each computed range and subtracts satellite clock rate error from each computed delta range thereby obtaining quantities analogous to the UCA pseudorange and UCA delta range supplied by the GPS receivers R1 and R2 to the Kalman filter K1 via combiners C1 and C2 respectively. These computed UCA pseudorange analogs and computed UCA delta range analogs are supplied to the Kalman filter K1.

Figure 11:
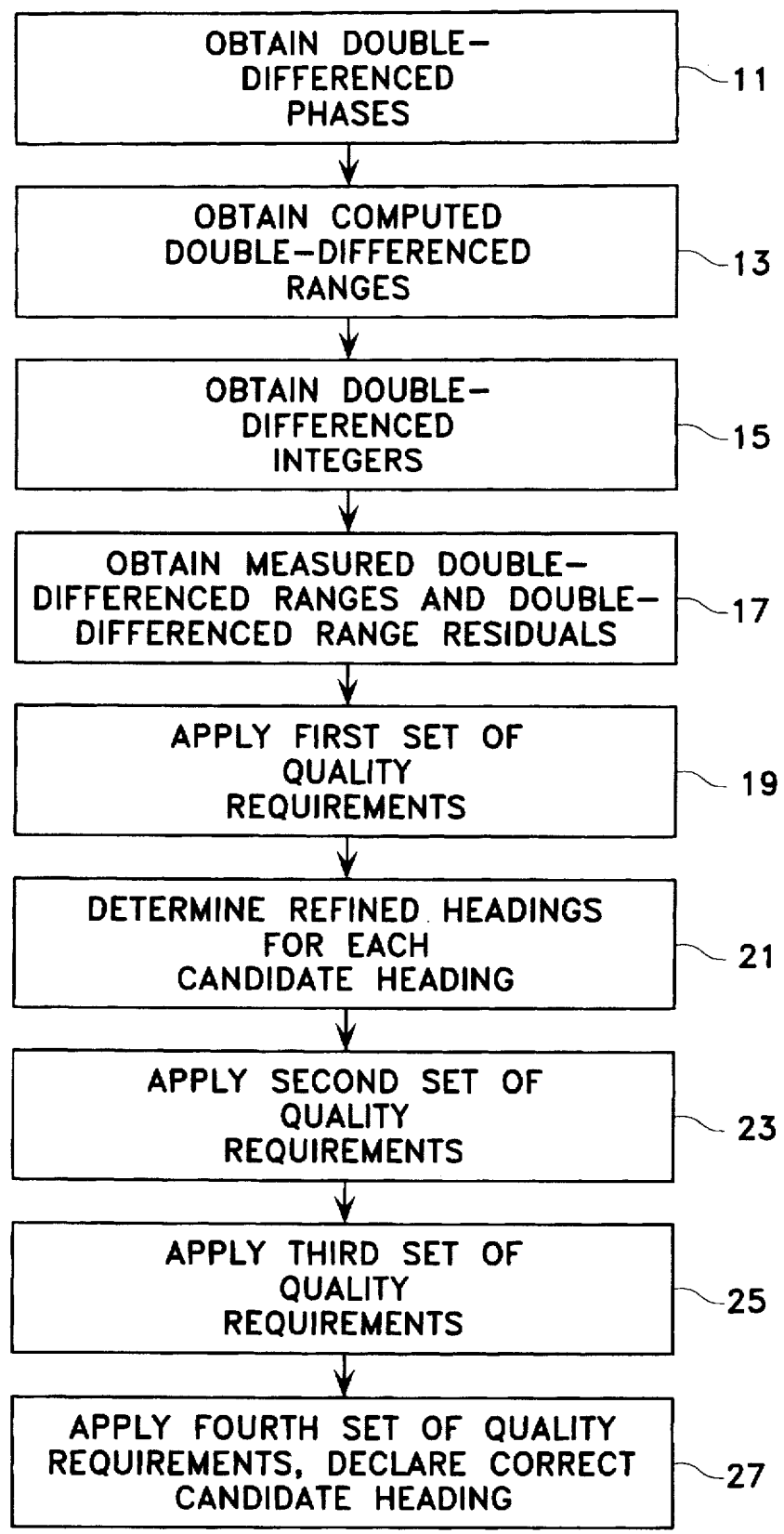
FIG. 11 shows the method steps of the invention.

The range processor P2 obtains the measured double-differenced range $(DD\rho)_m$ by executing the method shown in FIG. 11 at method intervals of typically one second.

In step 11 the range processor P2 obtains the double-differenced phase DD$\Phi$ for one or more satellite pairs from the double-difference processor P1.

In step 13 the range processor P2 obtains the computed double-differenced range $(DD\rho)_c$ for each of the satellite pairs and for each of a plurality of candidate headings which span an angular region extending from the IMU heading minus a first value to the IMU heading plus a second value.

The IMU heading is the heading of the platform as determined by the navigation processor P3. The value of first and second values should preferably be equal to a factor of four or more times the standard deviation of the error distribution of the IMU heading. The range processor P2 utilizes the location of a reference point on the platform together with the roll, pitch, and postulated heading of the platform and the relative locations of the two antennas to the platform reference point to determine the absolute locations of the two antennas in space. The ranges of the two antennas to the satellites comprising a satellite pair are calculated from the calculated locations of the two antennas and the known locations of the satellites. The computed double-differenced range is then obtained as indicated by equation E3 of FIG. 9.

In step 15, for each satellite pair and candidate heading, the range processor P2 obtains the double-differenced integer DDN by subtracting the double-differenced phase DD$\Phi$ from the computed double-differenced range $(DD\rho)_c$ and rounding the result to the nearest integer.

In step 17, for each satellite pair and candidate heading, the range processor P2 obtains the measured double-differenced range $(DD\rho)_m$ by adding the double-differenced integer DDN to the double-differenced phase DD$\Phi$. The range processor obtains the double-differenced range residual $\Delta(DD\rho)$ by subtracting the measured double-differenced range $(DD\rho)_m$ from the computed double-differenced range $(DD\rho)_c$.

For each candidate heading there is a set of double-differenced integers, one double-differenced integer for each satellite pair. In step 19 the range processor P2 discards the data associated with any candidate heading that does not satisfy a first set of quality requirements if a first set of quality requirements has been specified. Quality is used here in the sense of the is degree of suitability of the data in achieving the intended purpose of the invention. The highest quality data is the data which is most suitable for its intended purpose. An example of a quality measure is the reciprocal of the sum over all satellite pairs of the squares of the double-differenced range residuals. The first set of quality requirements may consist of one or more quality requirements.

The number of candidate headings should be sufficiently large that every possible set of double-differenced integers is represented in the candidate-heading data. On the other hand, the number of candidate headings should not be so large that duplicate sets of double-differenced integers appear in the candidate-heading data. If duplicate sets do occur, only one of the duplicate sets are retained for further processing.

In step 21 the range processor P2 determines one or more refined headings (corresponding to the end of the present method interval) for each candidate heading using candidate-heading data acquired during an evaluation interval. An evaluation interval for the present method interval may be the present method interval or the present method interval together with one or more prior method intervals. For example, one refined heading might be determined for an evaluation interval equal to the present method interval and another refined heading might be determined for an evaluation interval equal to the present method interval and ten prior method intervals.

The refined heading associated with a candidate heading is the heading having the same double-differenced integer set as the candidate heading and for which a quality measure is highest. For evaluation intervals consisting of two or more method intervals, the change in heading from one method interval to the next is postulated to be the change determined by the navigation processor P3. The determination of the refined heading given the candidate-heading data is a straightforward mathematical process. The candidate-heading data for all satellite pairs are used in this determination. However, the determination can be made even though only one satellite pair is available.

In step 23 the range processor P2 discards candidate-heading data if the refined heading fails to satisfy a second set of one or more quality requirements. An example of a quality requirement is the following: the reciprocal of the sum over all satellite pairs of the squares of the double-differenced range residuals must be greater than a specified threshold value.

In step 25 the range processor P2 retains candidate-heading data for the present method interval but discards candidate-heading data for all prior method intervals if the refined heading fails to satisfy a third set of one or more quality requirements. Examples of possible members of the third set of quality requirements are as follows:

the quality measure for the refined heading for a method interval is greater than a threshold value;

double-differenced integers associated with the same candidate heading are the same for the present and previous method intervals;

the ratio of the smaller value to the larger value of a quality measure for refined headings associated with the same candidate heading for present and previous method intervals is greater than a threshold value;

the difference between the IMU heading change and a refined heading change from the previous method interval to the present method interval is less than a threshold value;

the difference in refined headings associated with the same candidate heading for present and previous method intervals is less than a threshold value;

the values of a quality measure for refined headings associated with the same candidate heading for present and previous method intervals are greater than a threshold value.

In step 27 the range processor P2 determines whether any of the refined headings associated with the stored candidate-heading data satisfies a fourth set of quality requirements. If so, the associated candidate heading is declared to be the correct candidate heading for the present method interval. The fourth set of quality requirements is so designed that the refined headings associated with only one of the candidate headings, the correct candidate heading, can satisfy the requirements, and the double-differenced integers associated with the refined heading are the most likely to be correct.

Examples of possible members of the fourth set of requirements are as follows:

the quality measure of each of the refined headings associated with the correct candidate heading for one or more specified evaluation intervals is the highest of all refined headings for the same evaluation interval;

the quality measure of each of the refined headings associated with the correct candidate heading for one or more specified evaluation intervals is greater than a threshold value;

the quality measure of each of the refined headings associated with the correct candidate heading for one or more specified evaluation intervals having the second-highest quality measures is less than a threshold value;

the number of degrees of freedom accumulated over a specified number of method intervals is greater than a threshold value;

for the correct candidate heading, the difference between the change in each of the associated refined headings for one or more specified evaluation intervals from the previous method interval to the present method interval and the corresponding IMU heading change is less than a threshold value;

the ratio of the smaller to the larger of the quality measures of the refined headings associated with the correct candidate heading for evaluation intervals of different lengths is greater than a threshold value;

the change of each of the refined headings associated with the correct candidate heading for one or more specified evaluation intervals from the previous method interval to the present method interval is less than a threshold value.

An appropriate quality measure is the reciprocal of the sum over all satellite pairs of the squares of the double-differenced range residuals. Other possible quality measures would be apparent to a person skilled in the art.

If the range processor P2 declares a correct candidate heading in step 27, the double-differenced range residuals associated with a specified refined heading associated with the correct candidate heading is passed to the Kalman filter K1 for use in updating the navigation solution during the next Kalman iteration. The Kalman filter iteration interval may be longer than the method interval by an integer factor in which case the sums of the double-differenced range residuals for the method intervals contained in the Kalman filter interation interval are passed to the Kalman filter K1.

The Kalman filter K1 obtains a minimal mean-square-error solution of the navigation problem and supplies corrections to the input data in anticipation of the next iteration of the Kalman process, as indicated by the dotted lines in FIG. 10. The Kalman process is well-known and understood and will not be described here since it is described in detail in a number of textbooks, one example being A. Gelb, ed., *Applied Optimal Estimation*, The Analytical Sciences Corporation, The M.I.T. Press, Cambridge, Mass., 1974.

The key to the reliable determination of platform attitude is the phase double-difference which minimally requires carrier phase measurements of the signals received from at least two satellites at two or more separated points in space, the points being fixed with respect to the platform. The derivation of the Kalman filter observation matrix for double-differencing will be shown in the paragraphs that follow.

The Kalman filter observation that leads to a minimal mean-square-error estimate of attitude is z which is defined in FIG. 12 as the difference between the computed phase double-difference and the measured phase double-difference. The quantity z is related to the Kalman state residuals x by the observation matrix H, as shown by the last equation of FIG. 12. The derivation of the observation matrix is shown in FIGS. 13–19.

The first equation of FIG. 13 is obtained from the first and third equations of FIG. 9. The linearization of the quantities $p_{ij}-\rho_{ij}$ is shown in the remaining equations of FIG. 13.

The first equation of FIG. 13 with the help of the last equation of FIG. 13 can be written as shown in FIG. 14.

In FIG. 15 subscripts n (standing for "navigation (NAV) coordinate system") and f (standing for "earth-centered earth-fixed (ECEF) coordinate-system") identify the coordinate frame of reference for the components of the vectors appearing in earlier figures. The first two equations in the figure are evident from FIG. 3. The derivation of the differential of the transformation matrix $C_f^n$ is shown by the first two equations of FIG. 16. The last two lines of FIG. 16 show the relationships among the ECEF, NAV, and COMPUTER frames of reference.

The components of the $U_i$ and $dU_i$ vectors in the NAV frame of reference are given in FIG. 17.

The substitution of the equations of FIGS. 14 and 16 in the equation of FIG. 14 results in the equation shown in FIG. 18.

The expression of the equation of FIG. 18 in terms of the matrix components given in FIG. 19 and the vector components given in FIG. 20 and a comparison of the resulting equation with the defining equation for the single-row observation matrix H given in FIG. 12 enables the components of the observation matrix to be identified. These components are given in FIG. 21. The subscripts identifying the H components correspond to the Kalman states listed in FIG. 22. Other states not associated with the observation matrix also exist.

The plural states listed for a single symbol are ordered as x, y, and z. The term denoted as "computer azimuth" refers to the error about vertical due to variation of the North direction with longitude error. Abbreviations used in FIG. 21 are defined in FIG. 23.

The relative magnitudes of the quantities listed in FIG. 23 are indicated in FIG. 24. Since terms involving $\Delta$ are much smaller than terms involving $\nabla$, states 11 through 19 in FIG. 21 can be dropped. The simplified H matrix is shown in FIG. 25. Further simplification is possible by omitting the double difference terms of $H_1$, $H_2$, and $H_3$.

The advantages of an attitude determination apparatus based on the integration of interferometric GPS with an inertial measurement unit are numerous. Heading error is far less than the error resulting from normal gyrocompassing. Attitude outputs are available from a calibrated INS during satellite signal shading or total jamming. The INS aids the lane ambiguity problem by providing position and attitude. Full attitude determination (i.e. pitch, roll, and heading) can be obtained from only two antennas on board the platform. Complete smoothed attitude is obtained during periods of high dynamics and/or jamming. And estimates can be obtained of the "lever arm", the vector defining the position of one antenna relative to another, and of changes in the lever arm as a result of antenna phase center migration. By judicious antenna motions this lever arm estimation can be substantially enhanced.

The attitude determination apparatus utilizes at least two antennas at the ends of a known lever arm and integrates the determination of attitude into the navigation solution for a platform by means of a Kalman filter. This integration approach requires at least three additional states in the Kalman state vector to define the lever arm for a minimal configuration of two antennas. The structure of the apparatus assumes that the lane ambiguity resolution occurs off-line.

The Kalman filter states for the system illustrated in FIG. 10 are listed in FIG. 26.

Figure 27:
FIG. 27 shows the single-differenced equivalents of the double-differenced ranges shown in FIG. 9.

The invention has been described thus far in terms of using double-differenced phase observable in obtaining platform attitude solutions by means of a Kalman process. Double-differenced phases are not, however, the only observables that could be used. Single-differenced phases might also be used under certain circumstances. Consider the difference in phase of signals from one satellite arriving at the two antennas. The equations corresponding to those in FIG. 9 are shown in FIG. 27. Note that the dt, dion, and dtrop terms of FIG. 4 cancel out, as before. If the receivers share the same clock, than the dT terms also cancel out. Thus, single-differenced phase could be an acceptable alternative in some situations to double-differenced phase.

More than two antennas can also be used. For example, a possible phase observable for three antennas and the j'th satellite is $(\Phi_{3j}-2\Phi_{2j}+\Phi_{1j})$. Here also, the dt, dion, and dtrop terms of FIG. 4 cancel out.

The preferred embodiment of the invention envisions the use of the invention with the Global Positioning System. Other "satellite" systems can be envisioned where the cancellation of the dt, dion, and dtrop terms of FIG. 5 is not essential in which case an even wider selection of possible phase observables become available.

In view of the possibility of using any of a wide variety of phase observables in the present invention and to emphasize the invention's generality, it is important to recognize that the starting point of this invention is the definition of a range function $F(\rho ij)$ where i takes on integer values corresponding to the available antennas and j takes on integer values corresponding to the satellite transmitters in a satellite transmitter group consisting of one or more satellite transmitters. The satellite transmitters may be earth orbiting, fixed on earth, or carried by vehicles of some description. First and foremost, a suitable range function must provide a measure of the attitude of the platform for which attitude is to be determined. It may also be desirable in certain circumstances (e.g. when the invention is to be used with the Global Positioning System) to require that the range function be insensitive to the effects of the ionosphere and the troposphere and satellite transmitter clock errors. The single-differenced range $D\rho$ and the double-differenced range $DD\rho$ (see FIGS. 9 and 26) are species of the range function genus $F(\rho ij)$.

The computed range function is defined as $F(\rho ij)$ where $\rho ij$ is the range from the i'th antenna to the j'th satellite transmitter in a satellite transmitter group as computed from the locations of the antennas and the locations of the satellite transmitters. The computed single-differenced range $(D\rho)_c$ and the computed double-differenced range $(DD\rho)_c$ (see FIGS. 9 and 26) are species of the computed range function genus $F(\rho ij)$.

Finally, since in general the range function will be a linear combination of ranges, the measured range function is the sum of the phase function $F(\Phi ij)$ and the integer function $F(Nij)$. The single-differenced phase $D\Phi$ and the double-differenced phase $DD\Phi$ (see FIGS. 9 and 26) are species of the phase function $F(\Phi ij)$. The single-differenced integer DN (=−N21+N11) and the double-differenced integer DDN (=−N22+N21+N12−N11) are species of the integer function genus $F(Nij)$. A range function residual is the difference between the computed range function and the measured range function.

What is claimed is:

1. A method for obtaining observables for input to a Kalman filter process which determines the roll, pitch, and heading of a platform, the method utilizing an inertial measurement unit (IMU) attached to the platform and an associated processor, a plurality of signal receiving antennas attached to the platform, and a plurality of satellite transmitters, the platform having a reference point to which the IMU is referenced, the antennas having known locations relative to the platform reference point, the method being repeatedly executed at time intervals called method intervals, the Kalman filter process supplying roll, pitch, and heading corrections to the IMU and its associated processor at time intervals called Kalman filter intervals, a Kalman filter interval being a multiple of the method interval, the method comprising the following steps:

determining the value of a phase function for each of a plurality of satellite transmitter groups, a satellite transmitter group consisting of one or more satellite transmitters, a phase function being a function of the phases of the signals received from the satellite transmitters in a satellite transmitter group at the plurality of antennas;

obtaining pitch, roll, and heading of the platform from the IMU and its associated processor, the heading being called the IMU heading;

determining the value of a computed range function for each satellite transmitter group and for each of a plurality of candidate headings, a range function being a function of the ranges of the satellite transmitters in a satellite transmitter group to the plurality of antennas, the ranges for the computed range function being determined from ranges calculated from the locations of the satellite transmitters, the location of the platform reference point, the locations of the antennas relative to the platform reference point, the pitch and roll of the platform, and a candidate heading, the plurality of candidate headings spanning the range of headings from the IMU heading minus a first value to the IMU heading plus a second value;

determining the value of an integer function for each satellite transmitter group and for each candidate heading, the integer function being the difference in the computed range function and the phase function rounded to the nearest integer;

determining the value of a measured range function for each satellite-transmitter group and for each candidate heading, a measured range function being the sum of the phase function and the integer function;

eliminating candidate headings from further consideration under certain conditions, the conditions being that a first set of one or more quality requirements is specified and the candidate headings fail to satisfy the first set of quality requirements;

determining a refined candidate heading for each of one or more evaluation intervals for each of the remaining candidate headings utilizing the values of the measured range function for the satellite transmitter groups obtained during each of the one or more evaluation intervals, an evaluation interval including the present method interval and zero or more prior method intervals, a refined candidate heading being the heading for which a quality measure is highest.

2. The method of claim 1 wherein the phase function is a double-differenced phase and the range function is a double-differenced range, a double-differenced phase being the difference in the single-differenced phases for two satellite transmitters, a single-differenced phase for a satellite transmitter being the difference in phase of the signals received from the satellite transmitter at two antennas, a double-differenced range being the difference in the single-differenced ranges for the satellite transmitters, a single-differenced range for a satellite transmitter being the difference in ranges of the satellite transmitter to two antennas.

3. The method of claim 1 wherein the first set of one or more quality requirements is comprised of:

the quality measure for the candidate heading is greater than a threshold value.

4. The method of claim 1 wherein the quality measure is the reciprocal of the sum of the squares of range function residuals over all satellite transmitter groups, a range function residual being the difference in values of the computed range function and the measured range function.

5. The method of claim 1 further comprising the following steps:
- eliminating particular candidate headings from further consideration under certain conditions, the conditions being that a second set of one or more quality requirements is specified and the refined headings associated with the particular candidate headings fail to satisfy the second set of quality requirements;
- discarding the data associated with a candidate heading for prior method intervals under certain conditions, the conditions being that a third set of one or more quality requirements is specified and the refined headings associated with the candidate heading fail to satisfy the third set of quality requirements;
- declaring a candidate heading associated with a refined heading to be the correct candidate heading under certain conditions, the conditions being that a fourth set of one or more quality requirements is specified and the refined heading satisfies the fourth set of quality requirements, the range function residuals being made available to the Kalman process, a range function residual being the difference in values of a computed range function and the corresponding measured range function associated with the refined heading associated with the correct candidate heading.

6. The method of claim 5 wherein the second set of one or more quality requirements is comprised of:
- the quality measure for a refined heading is greater than a threshold value.

7. The method of claim 5 wherein the third set of one or more quality requirements is comprised of:
- the quality measure for a refined heading for a method interval is greater than a threshold value.

8. The method of claim 5 wherein the third set of one or more quality requirements is comprised of:
- the values of the integer function for the candidate heading associated with a refined heading are the same for the present and previous method intervals.

9. The method of claim 5 wherein the third set of one or more quality requirements is comprised of:
- the ratio of the smaller value to the larger value of a quality measure for refined headings associated with the same candidate heading for present and previous method intervals is greater than a threshold value.

10. The method of claim 5 wherein the third set of one or more quality requirements is comprised of:
- the difference between the IMU heading change and a refined heading change from the previous method interval to the present method interval is less than a threshold value.

11. The method of claim 5 wherein the third set of one or more quality requirements is comprised of:
- the difference in refined headings associated with the same candidate heading for present and previous method intervals is less than a threshold value.

12. The method of claim 5 wherein the third set of one or more quality requirements is comprised of:
- the values of a quality measure for refined headings associated with the same candidate heading for present and previous method intervals are greater than a threshold value.

13. The method of claim 5 wherein the fourth set of one or more quality requirements is comprised of:
- the quality measure of each of the refined headings associated with the correct candiate heading for one or more specified evaluation intervals is the highest of all refined headings for the same evaluation interval.

14. The method of claim 5 wherein the fourth set of one or more quality requirements is comprised of:
- the quality measure of each of the refined headings associated with the correct candidate heading for one or more specified evaluation intervals is greater than a threshold value.

15. The method of claim 5 wherein the fourth set of one or more quality requirements is comprised of:
- the quality measure of each of the refined headings associated with the correct candidate heading for one or more specified evaluation intervals having the second-highest quality measures is less than a threshold value.

16. The method of claim 5 wherein the fourth set of one or more quality requirements is comprised of:
- the number of degrees of freedom accumulated over a specified number of method intervals is greater than a threshold value.

17. The method of claim 5 wherein the fourth set of one or more quality requirements is comprised of:
- for the correct candidate heading, the difference between the change in each of the associated refined headings for one or more specified evaluation intervals from the previous method interval to the present method interval and the corresponding IMU heading change is less than a threshold value.

18. The method of claim 5 wherein the fourth set of one or more quality requirement is comprised of:
- the ratio of the smaller to the larger of the quality measures of the refined headings associated with the correct candidate heading for evaluation intervals of different lengths is greater than a threshold value.

19. The method of claim 5 wherein the fourth set of one or more quality requirement is comprised of: the change of each of the refined headings associated with the correct candidate heading for one or more specified evaluation intervals from the previous method interval to the present method interval is less than a threshold value.

20. Apparatus for practicing the method of claim 1.

21. Apparatus for practicing the method of claim 5.

22. Apparatus for obtaining observables for input to a Kalman filter process which determines the roll, pitch, and heading of a platform, the method utilizing an inertial measurement unit (IMU) attached to the platform and an associated processor, a plurality of signal receiving antennas attached to the platform, and a plurality of satellite transmitters, the platform having a reference point to which the IMU is referenced, the antennas having known locations relative to the platform reference point, the method being repeatedly executed at time intervals called method intervals, the Kalman filter process supplying roll, pitch, and heading corrections to the IMU and its associated processor at time intervals called Kalman filter intervals, a Kalman filter interval being a multiple of the method interval, the apparatus comprising:
- a means for determining the value of a phase function for each of a plurality of satellite transmitter groups, a satellite transmitter group consisting of one or more satellite transmitters, a phase function being a function of the phases of the signals received from the satellite transmitters in a satellite transmitter group at the plurality of antennas;
- a means for obtaining pitch, roll, and heading of the platform from the IMU and its associated processor, the heading being called the IMU heading;

a processor for determining the value of a computed range function for each satellite transmitter group and for each of a plurality of candidate headings, a range function being a function of the ranges of the satellite transmitters in a satellite transmitter group to the plurality of antennas, the ranges for the computed range function being determined from ranges calculated from the locations of the satellite transmitters, the location of the platform reference point, the locations of the antennas relative to the platform reference point, the pitch and roll of the platform, and a candidate heading, the plurality of candidate headings spanning the range of headings from the IMU heading minus a first value to the IMU heading plus a second value;

a means for determining the value of an integer function for each satellite transmitter group and for each candidate heading, the integer function being the difference in the computed range function and the phase function rounded to the nearest integer;

a means for determining the value of a measured range function for each satellite transmitter group and for each candidate heading, a measured range function being the sum of the phase function and the integer function;

a means for eliminating candidate headings from further consideration under certain conditions, the conditions being that a first set of one or more quality requirements is specified and the candidate headings fail to satisfy the first set of quality requirements;

a means for determining a refined candidate heading for each of one or more evaluation intervals for each of the remaining candidate headings utilizing the values of the measured range function for the satellite transmitter groups obtained during each of the one or more evaluation intervals, an evaluation interval including the present method interval and zero or more prior method intervals, a refined candidate heading being the heading for which a quality measure is highest.

23. The apparatus of claim 22 wherein the phase function is a double-differenced phase and the range function is a double-differenced range, a double-differenced phase being the difference in the single-differenced phases for two satellite transmitters, a single-differenced phase for a satellite transmitter being the difference in phase of the signals received from the satellite transmitter at two antennas, a double-differenced range being the difference in the single-differenced ranges for the satellite transmitters, a single-differenced range for a satellite transmitter being the difference in ranges of the satellite transmitter to two antennas.

24. The apparatus of claim 22 wherein the first set of one or more quality requirements is comprised of:

the quality measure for the candidate heading is greater than a threshold value.

25. The apparatus of claim 22 wherein the quality measure is the reciprocal of the sum of the squares of range function residuals over all satellite transmitter groups, a range function residual being the difference in values of the computed range function and the measured range function.

26. The apparatus of claim 22 further comprising the following steps:

a means for eliminating particular candidate headings from further consideration under certain conditions, the conditions being that a second set of one or more quality requirements is specified and the refined headings associated with the particular candidate headings fail to satisfy the second set of quality requirements;

a means for discarding the data associated with a candidate heading for prior method intervals under certain conditions, the conditions being that a third set of one or more quality requirements is specified and the refined headings associated with the candidate heading fail to satisfy the third set of quality requirements;

a means for declaring a candidate heading associated with a refined heading to be the correct candidate heading under certain conditions, the conditions being that a fourth set of one or more quality requirements is specified and the refined heading satisfies the fourth set of quality requirements, the range function residuals being made available to the Kalman process, a range function residual being the difference in values of a computed range function and the corresponding measured range function associated with the refined heading associated with the correct candidate heading.

27. The apparatus of claim 26 wherein the second set of one or more quality requirements is comprised of:

the quality measure for a refined heading is greater than a threshold value.

28. The apparatus of claim 26 wherein the third set of one or more quality requirements is comprised of:

the quality measure for a refined heading for a method interval is greater than a threshold value.

29. The apparatus of claim 26 wherein the third set of one or more quality requirements is comprised of:

the values of the integer function for the candidate heading associated with a refined heading are the same for the present and previous method intervals.

30. The apparatus of claim 26 wherein the third set of one or more quality requirements is comprised of:

the ratio of the smaller value to the larger value of a quality measure for refined headings associated with the same candidate heading for present and previous method intervals is greater than a threshold value.

31. The apparatus of claim 26 wherein the third set of one or more quality requirements is comprised of:

the difference between the IMU heading change and a refined heading change from the previous method interval to the present method interval is less than a threshold value.

32. The apparatus of claim 26 wherein the third set of one or more quality requirements is comprised of:

the difference in refined headings associated with the same candidate heading for present and previous method intervals is less than a threshold value.

33. The apparatus of claim 26 wherein the third set of one or more quality requirements is comprised of:

the values of a quality measure for refined headings associated with the same candidate heading for present and previous method intervals are greater than a threshold value.

34. The apparatus of claim 26 wherein the fourth set of one or more quality requirements is comprised of:

the quality measure of each of the refined headings associated with the correct candiate heading for one or more specified evaluation intervals is the highest of all refined headings for the same evaluation interval.

35. The apparatus of claim 26 wherein the fourth set of one or more quality requirements is comprised of:

the quality measure of each of the refined headings associated with the correct candidate heading for one or more specified evaluation intervals is greater than a threshold value.

36. The apparatus of claim 26 wherein the fourth set of one or more quality requirements is comprised of:

the quality measure of each of the refined headings associated with the correct candidate heading for one or more specified evaluation intervals having the second-highest quality measures is less than a threshold value.

37. The apparatus of claim 26 wherein the fourth set of one or more quality requirements is comprised of:

the number of degrees of freedom accumulated over a specified number of method intervals is greater than a threshold value.

38. The apparatus of claim 26 wherein the fourth set of one or more quality requirements is comprised of:

for the correct candidate heading, the difference between the change in each of the associated refined headings for one or more specified evaluation intervals from the previous method interval to the present method interval and the corresponding IMU heading change is less than a threshold value.

39. The apparatus of claim 26 wherein the fourth set of one or more quality requirement is comprised of:

the ratio of the smaller to the larger of the quality measures of the refined headings associated with the correct candidate heading for evaluation intervals of different lengths is greater than a threshold value.

40. The apparatus of claim 26 wherein the fourth set of one or more quality requirement is comprised of:

the change of each of the refined headings associated with the correct candidate heading for one or more specified evaluation intervals from the previous method interval to the present method interval is less than a threshold value.

* * * * *